US008597834B2

(12) United States Patent
Abe et al.

(10) Patent No.: US 8,597,834 B2
(45) Date of Patent: *Dec. 3, 2013

(54) NONAQUEOUS ELECTROLYTE SECONDARY BATTERY USING LITHIUM COBALT OXIDE AS A POSITIVE ACTIVE MATERIAL AND A NONAQUEOUS ELECTROLYTE CONTAINING A SULFONYL-CONTAINING COMPOUND AND VINYLENE CARBONATE

(75) Inventors: Koji Abe, Ube (JP); Kazuhiro Miyoshi, Ube (JP); Yasufumi Takahashi, Kobe (JP); Hiroyuki Fujimoto, Kobe (JP); Akira Kinoshita, Kobe (JP); Shingo Tode, Kobe (JP); Ikuro Nakane, Kobe (JP); Shin Fujitani, Kobe (JP)

(73) Assignees: Ube Industries Ltd., Ube (JP); Sanyo Electric Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/801,631

(22) Filed: Jun. 17, 2010

(65) Prior Publication Data

US 2010/0255384 A1  Oct. 7, 2010

Related U.S. Application Data

(62) Division of application No. 10/563,124, filed as application No. PCT/JP2005/002576 on Feb. 18, 2005, now Pat. No. 7,767,343.

(30) Foreign Application Priority Data

Mar. 30, 2004  (JP) ................................. 2004-099430

(51) Int. Cl.
  *H01M 4/13*  (2010.01)
  *H01M 6/16*  (2006.01)
(52) U.S. Cl.
  USPC ...... 429/231.95; 429/324; 429/325; 429/326; 429/218.1; 429/231.5; 429/231.6; 429/231.8; 429/231.9
(58) Field of Classification Search
  None
  See application file for complete search history.

(56) References Cited

U.S. PATENT DOCUMENTS

| 5,153,082 | A | 10/1992 | Ogino et al. | 429/231.4 |
|---|---|---|---|---|
| 6,277,521 | B1 * | 8/2001 | Gao et al. | 429/231.1 |
| 6,436,582 | B1 | 8/2002 | Hamamoto et al. | 429/340 |
| 6,534,216 | B1 | 3/2003 | Narukawa et al. | 429/224 |
| 6,582,852 | B1 | 6/2003 | Gao et al. | 429/231.1 |
| 7,150,940 | B2 | 12/2006 | Okochi et al. | |
| 7,438,991 | B2 | 10/2008 | Nishida et al. | |
| 2003/0087155 | A1 | 5/2003 | Cho et al. | 429/231.95 |
| 2003/0104279 | A1 * | 6/2003 | Miyazaki et al. | 429/231.3 |
| 2003/0148190 | A1 | 8/2003 | Hamamoto et al. | 429/326 |
| 2005/0069774 | A1 * | 3/2005 | Miyazaki et al. | 429/231.3 |
| 2006/0105240 | A1 | 5/2006 | Kinoshita et al. | |
| 2007/0196736 | A1 | 8/2007 | Takahashi et al. | |

FOREIGN PATENT DOCUMENTS

| CN | 1277468 A | 12/2000 |
|---|---|---|
| CN | 1474476 A | 2/2004 |
| EP | 1 662 600 A1 | 5/2006 |
| JP | 2000-215884 A | 8/2000 |
| JP | 2001-043895 A | 2/2001 |
| JP | 2001-57234 A | 2/2001 |
| JP | 2002-134167 A | 5/2002 |
| JP | 2002-158035 A | 5/2002 |
| JP | 2003-203673 A | 7/2003 |
| JP | 2003-229129 A | 8/2003 |
| JP | 2003-331921 A | 11/2003 |
| KR | 1999-034404 U | 8/1999 |
| KR | 2004-018154 A | 3/2004 |
| TW | 539647 | 7/2003 |
| TW | 561640 | 11/2003 |
| TW | 565961 | 11/2003 |
| WO | 01/42141 A1 | 6/2001 |
| WO | 02/093679 | 11/2002 |
| WO | 03/077350 A1 | 9/2003 |

OTHER PUBLICATIONS

Machine translation of JP 2002-158035, Hibara et al., May 31, 2002.*
Canadian Office Action dated Dec. 2, 2010, in Canadian patent application No. 2,525,923.
Supplementary European Search Report mailed Jul. 29, 2010, issued in EP 05 71 0409.
Taiwanese Office Action mailed Mar. 9, 2011, in Taiwanese patent application No. 10020192070.
Office Action dated Nov. 18, 2011, issued in Canadian patent application No. 2,525,923.
Nature, vol. 414, pp. 359-365 (2001).
Journal of the Electrochemical Society, 155 (7) A537-A541 (2008).

* cited by examiner

Primary Examiner — Kwang Han
(74) Attorney, Agent, or Firm — Kubovcik & Kubovcik

(57) ABSTRACT

A nonaqueous electrolyte secondary battery including a negative electrode containing a graphite material as the negative active material, a positive electrode containing lithium cobalt oxide as a main component of the positive active material and a nonaqueous electrolyte solution, the battery being characterized in that the lithium cobalt oxide contains a group IVA element selected from the group consisting of Ti, Zr and Hf and a group IIA element of the periodic table, the nonaqueous electrolyte solution contains 0.2-1.5% by weight of a sulfonyl-containing compound and preferably further contains 0.5-4% by weight of vinylene carbonate.

4 Claims, No Drawings

NONAQUEOUS ELECTROLYTE SECONDARY BATTERY USING LITHIUM COBALT OXIDE AS A POSITIVE ACTIVE MATERIAL AND A NONAQUEOUS ELECTROLYTE CONTAINING A SULFONYL-CONTAINING COMPOUND AND VINYLENE CARBONATE

This application is a division of application Ser. No. 10/563,124, filed Jan. 3, 2006, now U.S. Pat. No. 7,767,343 which is a 371 of international application PCT/JP2005/002576, filed Feb. 18, 2005, which claims priority based on Japanese Patent Application No. 2004-099430, filed Mar. 30, 2004, and which are incorporated herein by reference.

TECHNICAL FIELD

The present invention relates to a nonaqueous electrolyte secondary battery and particularly to a nonaqueous electrolyte secondary battery using a graphite material as the negative active material and lithium cobalt oxide as the positive active material.

BACKGROUND ART

In recent years, nonaqueous electrolyte secondary batteries using metallic lithium, an alloy capable of storing and releasing lithium or a carbon material as the negative active material and a lithium-containing transition metal complex oxide represented by the chemical formula $LiMO_2$ (M indicates a transition metal) as the positive active material have been noted as high-energy-density batteries.

A representing example of the lithium-containing transition metal complex oxide is lithium cobalt oxide ($LiCoO_2$), which has been already put to practical use as the positive active material for nonaqueous electrolyte secondary batteries. For nonaqueous electrolyte secondary batteries using a lithium transition metal oxide, such as lithium cobalt oxide, as the positive active material and a carbon material, such as graphite, as the negative active material, an end-of-charge voltage is generally prescribed at 4.1-4.2 V. In this case, the active material of the positive electrode utilizes only 50-60% of its theoretical capacity. Accordingly, if the end-of-charge voltage is increased to a higher value, a capacity (utilization factor) of the positive electrode can be improved to increase the battery capacity and energy density.

However, the higher end-of-charge voltage renders $LiCoO_2$ more prone to experience structural degradation and increases a tendency of an electrolyte solution to decompose on a surface of the positive electrode. In particular, when the battery is stored in a charged state at a high temperature, a gas generated as a result of a reaction between the positive electrode and the electrolyte solution increases a thickness of the battery, a reaction product increases a resistance and the positive electrode material is cause to disintegrate. These together deteriorate charge-discharge characteristics of the battery, which has been a problem.

To improve high-temperature storage characteristics of the nonaqueous electrolyte secondary batteries using lithium cobalt oxide as the positive active material and a graphite material as the negative active material, various techniques have been proposed heretofore. For example, Patent Literature 1 describes a method wherein a fluorine-substituted aromatic compound or a sulfonyl-containing compound is incorporated in an electrolyte solution.

However, in the case where the end-of-charge voltage of the battery is prescribed at a value (4.3 V or higher) that exceeds a conventional value of 4.2V, even if a fluorine-substituted aromatic compound or a sulfonyl-containing cyclic compound is added to an electrolyte solution, as described in Patent Literature 1, the battery shows a marked deterioration of performance when it is stored in a charged state at high temperatures. Thus, such an attempt has failed to achieve a sufficient improvement.

Patent Literature 1: Japanese Patent Laying-Open No. 2003-203673

DISCLOSURE OF THE INVENTION

It is an object of the present invention to provide a nonaqueous electrolyte secondary battery which uses lithium cobalt oxide as a main component of the positive active material and a graphite material as the negative active material, and which exhibits the increased charge-discharge capacity and shows the suppressed deterioration when stored in a charged state at high temperatures.

The nonaqueous electrolyte secondary battery of the present invention includes a negative electrode containing a graphite material as the negative active material, a positive electrode containing lithium cobalt oxide as a main component of the positive active material, and a nonaqueous electrolyte solution. Characteristically, lithium cobalt oxide contains a group IVA element and a group IIA element of the periodic table and the nonaqueous electrolyte solution contains 0.2-1.5% by weight of a sulfonyl-containing compound.

In batteries using lithium cobalt oxide as the positive active material, a carbon material as the negative active material and a nonaqueous solvent as the electrolyte solution, thickness increase and capacity reduction occur when they are stored in a charged state at high temperatures, presumably because cobalt in the active material which, when brought to a higher oxidation state by charge, causes decomposition of the electrolyte solution by its catalytic action and also causes breakage of crystal structure of the positive electrode.

In the nonaqueous electrolyte secondary battery of the present invention, an increase of battery thickness and a deterioration of characteristics are both suppressed during high-temperature storage, even when it is charged at a high charge voltage. Although not clear, the detailed cause thereof is presumably due to the following. The group IVA element and/or group IIA element loaded in lithium cobalt oxide lowers the activity of cobalt on a surface of the active material. In addition, the sulfonyl-containing compound contained in the electrolyte solution, when it decomposes, forms on a surface of the positive active material a sulfur-containing film which serves to prevent contact between the positive electrode and the electrolyte solution and accordingly retard the occurrence of a side reaction.

As shown in the below-given Comparative Example, such an effect can not be obtained from a sulfite-containing compound which similarly contains a sulfur but has only one double bond between sulfur and oxygen in the sulfite group.

Examples of sulfonyl-containing compounds as contained in the nonaqueous electrolyte solution in the present invention include 1,4-butanediol dimethanesulfonate and divinyl sulfone. Such compounds may be contained in the amount that varies depending upon the type of the compound used, preferably 0.5-1.5% by weight if it is 1,4-butanediol dimethanesulfonate or 0.2-0.5% by weight if it is divinyl sulfone. If its content is excessively small, the capacity deterioration retarding effect may not be obtained sufficiently. If its content is excessively large, the excessively thick film may be formed on a surface of the positive electrode to adversely affect the battery performance. What causes the desired content to vary depending on the type of the compound used is not clear. However, the way it decomposes appears to be a presumable cause. For that reason, the sulfonyl-containing compound is preferably contained in the amount of 0.2-1.5% by weight, in total.

The sulfonyl-containing compound is not limited to those described above and may preferably be a chain compound having a hydrocarbon chain. Specific examples of such chain compounds include dimethyl sulfone, ethylmethyl sulfone, diethyl sulfone, ethylvinyl sulfone, ethylene glycol dimethanesulfonate, 1,3-propanediol dimethanesulfonate, 1,5-pentanediol dimethanesulfonate and 1,4-butanediol diethanesulfonate.

In the present invention, a graphite material is used as the active material of the negative electrode. It is accordingly preferred that the electrolyte solution further contains 0.5-4% by weight of vinylene carbonate. This is because vinylene carbonate, when decomposes, forms on a surface of the negative electrode a film that serves to retard a reaction between the negative electrode and electrolyte solution when the battery is stored in a charged state at high temperatures. For the same reason, a solvent for use in the electrolyte solution preferably contains ethylene carbonate.

In the present invention, the sulfonyl-containing compound content and the vinylene carbonate content are both based on the total amount of the solvent and solute of the nonaqueous electrolyte solution. The sulfonyl-containing compound is preferably contained in the amount of 0.2-1.5 parts by weight, based on 100 parts by weight of the solvent and solute. Vinylene carbonate is preferably contained in the amount of 0.5-4 parts by weight, based on 100 parts by weight of the solvent and solute.

The solvent for use in the electrolyte solution of the nonaqueous electrolyte secondary battery of the present invention is not particularly specified in type and can be selected from those generally used in nonaqueous electrolyte secondary batteries. A particularly preferred solvent is a mixed solvent of cyclic carbonates and chain carbonates. Examples of cyclic carbonates include ethylene carbonate and propylene carbonate. Examples of chain carbonates include dimethyl carbonate, ethyl methyl carbonate and diethyl carbonate. Particularly desirable among them is a mixed solvent containing diethyl carbonate as the chain carbonate. Also in the present invention, the ratio by volume of the cyclic to chain carbonate in the electrolyte solution is preferably 10:90-30:70. The use of such an electrolyte solution further retards an oxidative decomposition reaction of the electrolyte solution in a highly charged condition at high temperatures.

The solute of the nonaqueous electrolyte solution for use in the present invention can be selected from lithium salts generally used as solutes in nonaqueous electrolyte secondary batteries. Examples of such lithium salts include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$ and mixtures thereof. $LiPF_6$ (lithium hexafluorophosphate), among them, is preferably used.

In the present invention, lithium cobalt oxide, which is the active material of the positive electrode, contains a group IVA element and a group IIA element. Specific examples of group IVA elements include titanium, zirconium and hafnium. The use of zirconium, among them, is particularly preferred. Specific examples of group IIA elements include beryllium, magnesium, calcium, strontium, barium and radium. Preferred among them are magnesium, calcium, strontium and barium. Magnesium is particularly preferred.

The group IVA element content of lithium cobalt oxide is preferably 0.05-2 mole %. The group IIA element content of lithium cobalt oxide is preferably 0.1-2.0 mole %. If these contents are excessively low, the capacity deterioration retarding effect may not be obtained sufficiently. On the other hand, the excessively increased contents thereof may adversely affect discharge characteristics of the positive electrode.

In the present invention, a capacity of the battery can be improved by increasing the end-of-charge voltage. In such a case, when the end-of-charge voltage is prescribed at a certain value according to a design criterion, a ratio in charge capacity of the negative electrode to the positive electrode (negative electrode charge capacity/positive electrode charge capacity) in their portions opposed to each other is preferably in the range of 1.0-1.2. If the ratio in charge capacity of the negative to positive electrode is preset at 1.0 or above, deposition of metallic lithium on a surface of the negative electrode can be restrained. That is, when the end-of-charge voltage is designed at 4.3 V or 4.4 V, in either case, a ratio in charge capacity of the negative to positive electrode (negative electrode charge capacity/positive electrode charge capacity) in their portions opposed to each other is preferably in the range of 1.0-1.2. If the end-of-charge voltage exceeds 4.4 V, the effect that retards decomposition of the electrolyte solution or suppresses disintegration of the positive electrode may become insufficient. The end-of-charge voltage is thus preferred not to exceed 4.4 V.

The electrolyte solution of the present invention is applicable to a nonaqueous electrolyte secondary battery which includes a negative electrode containing a graphite material as its active material, a positive electrode containing lithium cobalt oxide containing a group IVA element and a group IIA element of the periodic table as a main component of its active material and a nonaqueous electrolyte solution. Characteristically, the electrolyte solution contains 0.2-1.5% by weight of a sulfonyl-containing compound.

In accordance with the present invention, a nonaqueous electrolyte secondary battery can be provided which exhibits the increased charge-discharge capacity and is less susceptible to deterioration when stored in a charged state at high temperatures.

BEST MODE FOR CARRYING OUT THE INVENTION

The present invention is below described in more detail by way of Examples. It will be recognized that the following examples merely illustrate the present invention and are not intended to be limiting thereof. Suitable changes can be effected without departing from the scope of the present invention.

Nonaqueous electrolyte secondary batteries were constructed and evaluated for storage characteristics in the charged state, in accordance with the procedures which follow.

EXAMPLE 1

[Preparation of Positive Active Material]

$Li_2CO_3$, $Co_3O_4$, $ZrO_2$ and $MgO$ were mixed in an Ishikawa automated mortar such that a molar ratio Li:Co:Zr:Mg was brought to 1:0.99:0.005:0.005, heat treated in the air atmosphere at 850° C. for 20 hours and pulverized to obtain a lithium-containing transition metal complex oxide having a mean particle diameter of about 14 μm. Its BET specific surface area was 0.4 m²/g.

[Fabrication of Positive Electrode]

The above-prepared positive active material, carbon as an electrical conductor and polyvinylidene fluoride as a binder at a ratio by weight of 90:5:5, were added to N-methyl-2-pyrrolidone as a dispersing medium. The mixture was kneaded to prepare a cathode mix slurry. The prepared slurry was coated on an aluminum foil as a current collector, dried and then rolled by a pressure roll. Subsequent attachment of a current collecting tab completed fabrication of a positive electrode.

[Fabrication of Negative Electrode]

Artificial graphite as a negative active material and a styrene-butadiene rubber as a binder were mixed in an aqueous solution of carboxymethylcellulose as a thickener so that the mixture contained the active material, binder and thickener in the ratio by weight of 95:3:2. The mixture was then kneaded to prepare an anode mix slurry. The prepared slurry was applied onto a copper foil as a current collector, dried and rolled by a pressure roll. Subsequent attachment of a current collecting tab completed fabrication of a negative electrode.

[Preparation of Electrolyte Solution]

Ethylene carbonate (EC) and diethyl carbonate (DEC) were mixed at a 2:8 ratio by volume to provide a mixed solvent in which lithium hexafluorophosphate ($LiPF_6$) was subsequently dissolved in the concentration of 1 mole/liter. Further, vinylene carbonate (VC) and 1,4-butanediol dimethanesulfonate (BDDMS) were added each in the amount of 1.0% by weight, based on the total amount of the aforementioned solvent and solute, to prepare an electrolyte solution.

[Construction of Battery]

The above-fabricated positive and negative electrodes were wound, while interposing a separator between them, to provide a wound electrode assembly. In a glove box maintained under an Ar atmosphere, this wound electrode assembly and the electrolyte solution were encapsulated in a casing made of an aluminum laminate. As a result, a nonaqueous electrolyte secondary battery A1 was obtained having standard dimensions of 3.6 mm in thickness, 3.5 cm in width and 6.2 cm in length.

In the above procedure, the respective amounts of the positive and negative active materials used are selected such that when operated at an end-of-charge voltage of 4.4 V, the ratio in charge capacity of the negative to positive electrode (charge capacity of negative electrode/charge capacity of positive electrode) is 1.15. This ratio in charge capacity of the negative to positive electrode also applies to the following Examples and Comparative Examples.

[Evaluation of Storage Characteristics in Charged State]

The above-constructed battery was charged at a constant current of 650 mA to a voltage of 4.4 V, further charged at a constant voltage of 4.4 V to a current value of 32 mA and then discharged at a constant current of 650 mA to a voltage of 2.75 V to measure a discharge capacity (mAh) of the battery before storage.

The battery was recharged to 4.4 V in the same manner as above and then its thickness was measured. The measured thickness was recorded as a thickness of the battery before it is stored in the charged state.

The recharged battery was stored in a thermostatic chamber at 60° C. for 5 days. After storage, the battery was removed and cooled sufficiently. Thereafter, its thickness was measured. A difference in thickness of the battery prior to storage in the charged state and subsequent to cooling following storage in the charged state was divided by a thickness of the battery prior to storage in the charged state to obtain a value. This value was recorded as a swelling rate of the battery.

The battery after cooled was discharged at a constant current of 650 mA to a voltage of 2.75 V, then charged to 4.4 V in the manner as described above, and again discharged at a constant current of 650 mA to a voltage of 2.75 V to measure a discharge capacity (mAh) of the battery after storage. This discharge capacity after storage was defined as a restored capacity. The value obtained by dividing the restored capacity by the discharge capacity of the battery before storage was recorded as a capacity restoration rate.

The measurement results for battery swelling rate and capacity restoration rate are shown in Table 1.

EXAMPLE 2

In Preparation of Electrolyte Solution, 1,4-butanediol dimethanesulfonate (BDDMS) was added in the amount of 0.5% by weight. Otherwise, the procedure of Example 1 was followed to prepare an electrolyte solution.

In the same manner as in Example 1, a nonaqueous electrolyte secondary battery A2 was constructed using this electrolyte solution and its storage characteristics in the charged state were evaluated.

EXAMPLE 3

In Preparation of Electrolyte Solution, 1,4-butanediol dimethanesulfonate (BDDMS) was added in the amount of 1.5% by weight. Otherwise, the procedure of Example 1 was followed to prepare an electrolyte solution.

In the same manner as in Example 1, a nonaqueous electrolyte secondary battery A3 was constructed using this electrolyte solution and its storage characteristics in the charged state were evaluated.

In the preceding examples, this additive (BDDMS) was dissolved in the amount of up to 1.5% by weight. However, addition of the highly soluble, sulfonyl-containing compound, even if in the amount of at least 1.5% by weight, is believed to result in obtaining the same effect.

EXAMPLE 4

In Preparation of Electrolyte Solution, 1.0% by weight of 1,4-butanediol dimethanesulfonate (BDDMS) was replaced by 0.5% by weight of divinyl sulfone (VS). Otherwise, the procedure of Example 1 was followed to prepare an electrolyte solution.

In the same manner as in Example 1, a nonaqueous electrolyte secondary battery A4 was constructed using this electrolyte solution and its storage characteristics in the charged state were evaluated.

EXAMPLE 5

In Preparation of Electrolyte Solution, divinyl sulfone (VS) was added in the amount of 0.2% by weight. Otherwise, the procedure of Example 4 was followed to prepare an electrolyte solution.

In the same manner as in Example 1, a nonaqueous electrolyte secondary battery A5 was constructed using this electrolyte solution and its storage characteristics in the charged state were evaluated.

COMPARATIVE EXAMPLE 1

In Preparation of Electrolyte Solution, 1,4-butanediol dimethanesulfonate (BDDMS) was not added and vinylene carbonate (VC) alone was added. Otherwise, the procedure of Example 1 was followed to prepare an electrolyte solution.

In the same manner as in Example 1, a nonaqueous electrolyte secondary battery X1 was constructed using this electrolyte solution and its storage characteristics in the charged state were evaluated.

COMPARATIVE EXAMPLE 2

In Preparation of Electrolyte Solution, 1.0% by weight of 1,4-butanediol dimethanesulfonate (BDDMS) was replaced by 2.0% by weight of ethylene sulfite (ES). Otherwise, the procedure of Example 1 was followed to prepare an electrolyte solution.

In the same manner as in Example 1, a nonaqueous electrolyte secondary battery X2 was constructed using this electrolyte solution and its storage characteristics in the charged state were evaluated.

COMPARATIVE EXAMPLE 5

In Preparation of Electrolyte Solution, 1.0% by weight of vinylene carbonate (VC) and 0.5% by weight of divinyl sulfone (VS) were added. Otherwise, the procedure of Comparative Example 3 was followed to prepare an electrolyte solution.

In the same manner as in Comparative Example 3, a nonaqueous electrolyte secondary battery X5 was constructed using this electrolyte solution and its storage characteristics in the charged state were evaluated.

For the constructed nonaqueous electrolyte secondary batteries A1-A5 of Examples 1-5 and X1-X5 of Comparative Examples 1-5, the evaluation results of their storage characteristics in the charged state are shown in Table 1.

The swelling and capacity restoration of each battery are given in percentages.

TABLE 1

|  |  | Battery | Additive Element in Positive Electrode | Material Loaded in Electrolyte Solution (Loading/wt. %) | Battery Swelling After 5 Days at 60° C. (%) | Capacity Restoration After 5 Days at 60° C. (%) |
|---|---|---|---|---|---|---|
| Ex. | 1 | A1 | Zr-0.5 mol % Mg-0.5 mol % | VC (1.0), BDDMS (1.0) | 3.2 | 90.7 |
|  | 2 | A2 | Zr-0.5 mol % Mg-0.5 mol % | VC (1.0), BDDMS (0.5) | 14.0 | 79.2 |
|  | 3 | A3 | Zr-0.5 mol % Mg-0.5 mol % | VC (1.0), BDDMS (1.5) | 4.2 | 75.3 |
|  | 4 | A4 | Zr-0.5 mol % Mg-0.5 mol % | VC (1.0), VS (0.5) | 0.8 | 98.2 |
|  | 5 | A5 | Zr-0.5 mol % Mg-0.5 mol % | VC (1.0), VS (0.2) | 9.3 | 77.9 |
| Comp. Ex. | 1 | X1 | Zr-0.5 mol % Mg-0.5 mol % | VC (1.0) | 3.2 | 64.1 |
|  | 2 | X2 | Zr-0.5 mol % Mg-0.5 mol % | VC (1.0), ES (2.0) | 62.9 | 73.7 |
|  | 3 | X3 | — | VC (1.0) | 6.4 | 74.0 |
|  | 4 | X4 | — | VC (1.0), BDDMS (1.0) | 9.0 | 74.8 |
|  | 5 | X5 | — | VC (1.0), VS(0.5) | 6.4 | 85.6 |

COMPARATIVE EXAMPLE 3

In Preparation of Positive Active Material, $ZrO_2$ and MgO were excluded and only $Li_2CO_3$ and $CO_3O_4$ were mixed such that a molar ratio Li:Co was brought to 1:1. Otherwise, the procedure of Comparative Example 1 was followed to prepare a positive active material.

In the same manner as in Comparative Example 1, a nonaqueous electrolyte secondary battery X3 was constructed with the use of this positive active material and its storage characteristics in the charged state were evaluated.

COMPARATIVE EXAMPLE 4

In Preparation of Electrolyte Solution, vinylene carbonate (VC) and 1,4-butanediol dimethanesulfonate (BDDMS) were added each in the amount of 1.0% by weight. Otherwise, the procedure of Comparative Example 3 was followed to prepare an electrolyte solution.

In the same manner as in Comparative Example 3, a nonaqueous electrolyte secondary battery X4 was constructed using this electrolyte solution and its storage characteristics in the charged state were evaluated.

As can be clearly seen from Table 1, all the batteries A1-A5 in accordance with the present invention not only show the suppressed battery swelling after stored in the charged state but also exhibit the improved capacity restoration.

The batteries A1-A5 including an electrolyte solution containing a sulfonyl-containing compound dissolved therein show the suppressed swelling after stored in the charged state and the improved capacity restoration, compared to the battery X1 excluding such a compound and the battery X2 containing a sulfite-containing compound.

Also, the following becomes apparent. Introduction of sulfonyl groups in the electrolyte solution improves storage characteristics in the charged state. This improving effect becomes more significant when zirconium or magnesium is added to lithium cobalt oxide that is a chief material of the positive electrode. On the other hand, the batteries X3, X4 and X5 in which an additive element is excluded from lithium cobalt oxide fail to suppress swelling during storage in the charged state, even if a sulfonyl-containing compound is added. Also, their capacity restoration is little improved.

The invention claimed is:
1. A nonaqueous electrolyte secondary battery including a negative electrode containing a graphite material as the negative active material, a positive electrode containing lithium cobalt oxide as a main component of the positive active mate- rial and a nonaqueouselectrolyte solution, said battery being characterized in that said lithium cobalt oxide contains Zr and Mg and said nonaqueous electrolyte solution contains 0.2-1.5% by weight of divinyl sulfone and further contains vinylene carbonate.

2. The nonaqueous electrolyte secondary battery as recited in claim 1, characterized in that the content of vinylene carbonate is 0.5-4% by weight.

3. The nonaqueous electrolyte secondary battery as recited in claim 1, characterized in that the content of divinyl sulfone is 0.2-0.5% by weight.

4. The nonaqueous electrolyte secondary battery as recited in claim 1, characterized in that the Zr content of the lithium cobalt oxide is 0.05-2.0 mole % and the Mg content of the lithium cobalt oxide is 0.1-2.0 mole %.

* * * * *